Patented Nov. 22, 1932

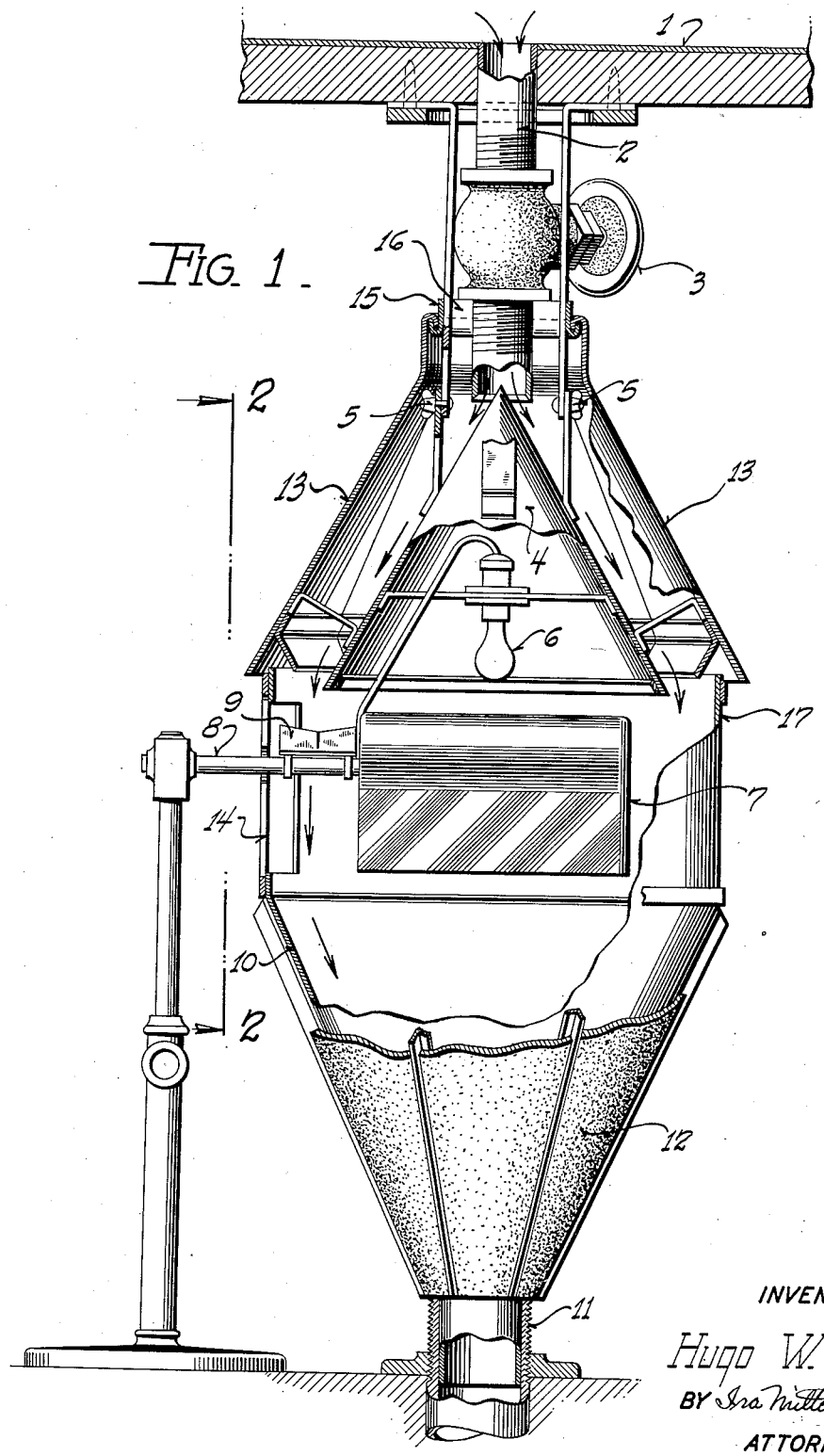

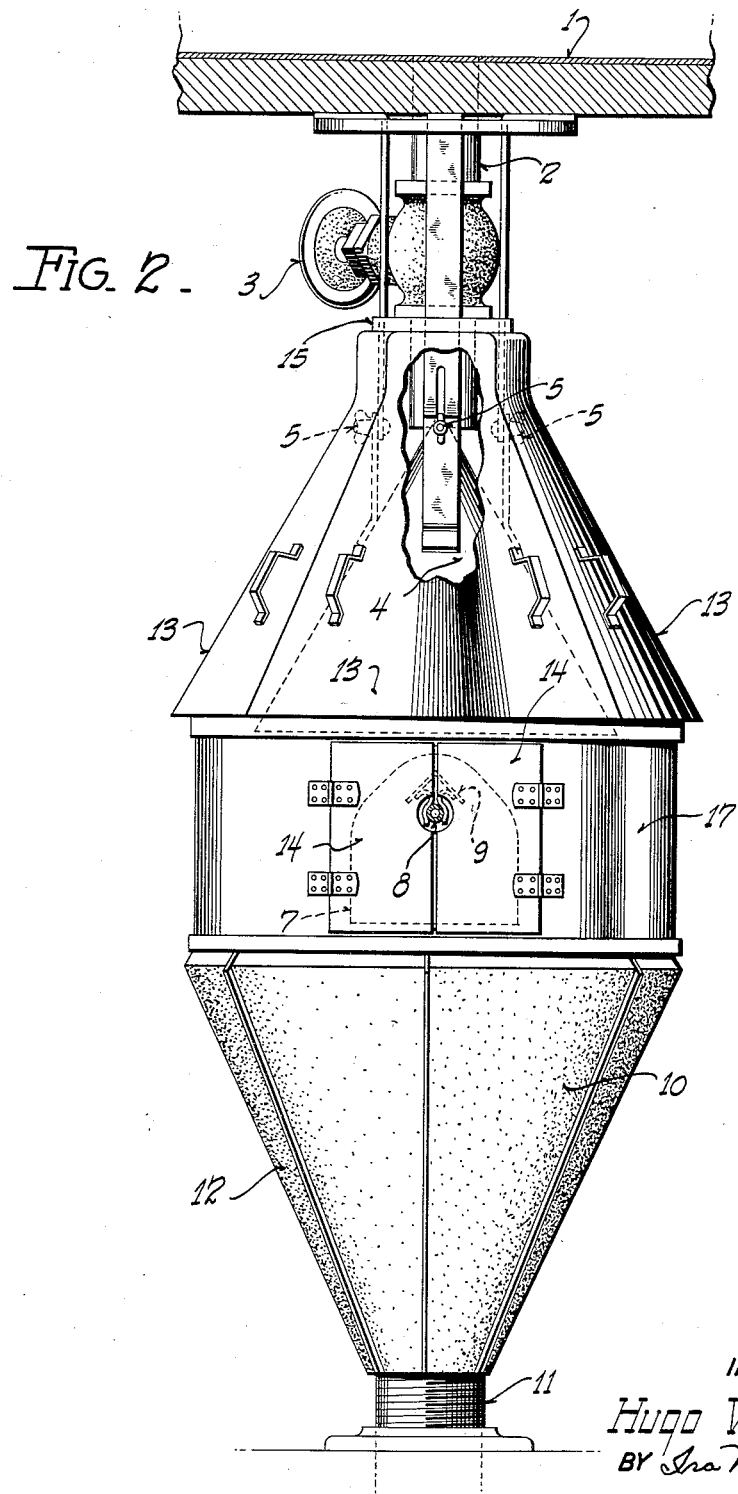

1,888,472

UNITED STATES PATENT OFFICE

HUGO W. ROHDE, OF SHOREWOOD, WISCONSIN, ASSIGNOR TO JOS. SCHLITZ BEVERAGE COMPANY, OF MILWAUKEE, WISCONSIN, A CORPORATION OF WISCONSIN

APPARATUS FOR STERILIZING FOOD SUBSTANCES

Original application filed February 9, 1931, Serial No. 514,456. Divided and this application filed October 1, 1931. Serial No. 566,277.

This invention relates to the sterilization of malt extracts and similar food substances as brought out in my copending application, Serial No. 514,456, filed February 9th, 1931, and of which this application is a division, and refers more particularly to an apparatus for subjecting malt extracts and similar substances to actinic rays or other light treatment.

As brought out in detail in the above noted application, the subjection of malt extracts and similar food substances to the full spectrum of a mercury vapor arc contained in a quartz tube, or to the full spectrum of an open carbon arc, greatly improves the stability and keeping qualities of the product and enhances its flavor and attractiveness. However, the inherent nature of malt extracts and particularly its heavy viscous consistency at normal temperature makes it difficult to effect the desired light treatment.

Hence, it is an object of this invention to provide an apparatus for treating malt extracts and similar substances wherein means are provided for spreading the materials being treated into a film of exactly the proper thickness to absorb with the greatest effect the desired rays.

Another object of this invention resides in the provision of an apparatus for subjecting malt extracts and similar food substances to actinic rays wherein the subjection of the substances to the desired rays is brought about within a zone to which the admission of air is limited so that ozone may be formed in the material to a desired degree.

Another object of this invention resides in the provision of an apparatus of the character described which embodies means for heating the substance to insure a free flowing condition, without danger of excessive heating which would have a destructive effect upon the substance being treated.

With the above and other objects in view which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

In the accompanying drawings, one complete example of the physical embodiment of this invention is illustrated constructed according to the best mode so far devised for the practical application of the principles thereof, and in which:

Figure 1 is a partial sectional view of the device viewed from the side; and

Figure 2 is another view of the device taken on the plane of the line 2—2 of Figure 1.

Referring now more particularly to the accompanying drawings, in which like numerals designate like parts throughout the several views, the numeral 1 represents a tank or container, only the bottom of which is shown, for the material to be treated. Leading from the tank is an outlet pipe or duct 2 having a control means 3 which preferably is a quick action shut-off valve. The material is discharged from the lower extremity of the outlet pipe 2 onto a cone 4 adjustably supported by suitable adjusting means 5, so that its relation to the lower extremity of the outlet pipe may be varied and fixed in any desired position. The material spreads over the surface of the cone 4 and falls freely from the periphery of its base in the form of a freely falling curtain.

While in the tank 1, the material being treated is maintained at the proper temperature to keep it in a perfectly fluid state, but not at such a temperature as will cause appreciable thermal decomposition. In passing over the surface of the cone 4, a considerable loss of heat takes place and to offset this loss a heating means 6, is provided for the purpose of maintaining the temperature of the material. The heating means 6 which may be of any suitable type, is preferably disposed within the hollow interior of the cone 4, and conveys its heat to the material flowing over the conical surface by radiation and/or convection.

By carefully adjusting means 5, and controlling valve means 3, a freely falling curtain of the proper thickness can be maintained surrounding a radiant source 7. In falling past the radiant source 7, the material is subjected to the effect of the full spectrum of a mercury vapor arc or a carbon arc.

In subjecting the material to the effect of the radiant source 7, a portion of the bacteria contained are killed directly by certain wave lengths of light emanating from the radiant source. In addition to this certain of the wave lengths of light ionize and convert to ozone, directly in the material, the oxygen which the material has dissolved from the limited air supply provided.

The radiant source 7, may be mounted from a supporting means 8, upon which is placed a concave wedge shaped hood 9, for the purpose of parting the falling curtain and prevent its clinging to member 8.

The falling curtain is caught by a funnel-like collecting member 10, in which it is gathered and discharged into outlet 11. The temperature of the material in the collector 10, is maintained by a heat insulating means 12, which covers the outer surface of the collector. In this manner the material is discharged into outlet 11 in a perfectly fluid state.

The upper casing of the device is preferably comprised of removable segmental cover sections 13 to permit ready access to the interior of the device so that perfect adjustment may be obtained. The segmental cover sections 13 have their upper extremities directed inwardly to engage over a ring member 15 supported from the tank and from which the segmental cover sections derive a portion of their support. Inasmuch as the ring 15 and consequently the upper end of the casing formed by the combined cover sections is of greater diameter than the pipe 2, an annular space 16 is provided to permit a limited amount of air to be drawn into the casing which passes over the material being treated.

For the purpose of the ready adjustment and repair of the radiant means 7, doors 14 are provided in the side of wall 17 of the device.

From the foregoing description taken in connection with the accompanying drawings, it will be readily apparent to those skilled in the art to which an invention of the character described appertains, that the apparatus of this invention affords a practical and efficient structure for subjecting malt extracts and similar food substances to actinic rays, and that the substance may be treated therein in large quantities and in a continuous process.

What I claim as my invention is:

1. A device for improving malt extract which comprises conical means located coaxially beneath tubular means for spreading malt extract discharged through said tubular means into a freely falling cylindrical curtain, heating means operable to keep the extract in a fluid state, means for emitting highly actinic light placed within said freely falling curtain, insulated means for collecting said malt extract, means for admitting a limited amount of air, and enclosing means enveloping said freely falling curtain and said conical means.

2. An apparatus of the character described, comprising tubular means for discharging the material to be treated, a conical member arranged with its apex beneath the outlet of the tubular means to cooperate therewith and spread the material over the conical member to fall therefrom in a cylindrical curtain, means for adjusting the conical member with respect to the outlet to regulate the thickness of said curtain of falling material, means for emitting highly actinic light located within the freely falling curtain to treat the material as it falls therepast, and means for receiving the treated material.

3. An apparatus of the character described, comprising a conical member, a material discharge member having its outlet above the apex of the conical member whereby material discharged therefrom flows down over the conical member and falls from the base thereof in a cylindrical curtain, a funnel-like collecting member beneath the conical member to receive the falling curtain of material and down which the material flows in a film, and means emitting highly actinic light disposed within the cylindrical curtain of falling material to treat the material as it falls in a curtain and as it flows down the funnel-like collecting member.

4. An apparatus of the character described, comprising a conical member, a discharge member having an outlet adapted to discharge material onto the apex of the conical member whereby the material flows down over the conical member and drops from its base in a falling cylindrical curtain, heating means within the conical member to maintain the material in a fluid state, means for emitting highly actinic light beneath the base of the conical member to treat the material falling in a cylindrical curtain, and means for receiving the treated material, said receiving means being disposed beneath the light emitting means so that the treatment of the material is continued while on said receiving means.

5. An apparatus of the character described, comprising a member having an inclined surface, a material discharge member adapted to discharge material onto the inclined surface and having its outlet adjacent said member and cooperating with the member to regulate the volume of material flowing over the inclined surface, heating means beneath the inclined surface for maintaining the material in a fluid state, and means for subjecting the material to highly actinic rays as it leaves the inclined surface.

6. An apparatus of the character described, comprising a material spreading member having an inclined surface, a material discharge member having an outlet adjacent said member whereby said member and the outlet cooperate to regulate the volume of material flowing over the inclined surface, means for adjusting the members with respect to each other to vary the volume of material flowing over the inclined surface, the material falling from the bottom of the inclined surface in a thin curtain, and means for emitting highly actinic light for treating the material as it falls from the inclined surface.

7. An apparatus of the character described, comprising a hollow cone member, a discharge member above the cone member with its outlet adjacent the apex of the cone member whereby the outlet and apex of the cone member cooperate to meter the volume of material issuing from the outlet member, means for adjusting the members with respect to each other, the material flowing down over the hollow cone member dropping from the base thereof in a cylindrical curtain, means for emitting highly actinic light rays for treating the material as it falls, and means for collecting the material after its treatment by the light rays.

8. An apparatus for treating food substances which are of thick viscous consistency at normal temperature, comprising a cone, means for discharging the substance to be treated onto the apex of the cone, means for heating the cone whereby the substance is maintained in a fluid state and flows down over the cone to drop from its base in a falling cylindrical curtain, a source of actinic light rays beneath the cone for treating the substance as it falls in a cylindrical curtain, and means for receiving the treated substance.

9. An apparatus for treating food substances comprising a cone, means for discharging the substance to be treated onto the apex of the cone whereby it flows down over the cone to drop from its base in a falling cylindrical curtain, a source of highly actinic light, means for supporting said source of actinic rays beneath the cone so that the falling curtain of material surrounds the same and is subjected to the rays, and an enclosure for the cone and source of actinic rays, part of said enclosure collecting the treated material.

10. An apparatus for treating food substances with actinic light rays comprising a cone, means for discharging the substance to be treated onto the apex of the cone whereby it flows down over the cone and drops from the base of the cone in a cylindrical curtain, a source of highly actinic light beneath the cone whereby the falling curtain of material is subjected to the rays issuing therefrom, means for collecting the treated material, and an enclosure for the cone and source of actinic rays having means for admitting a limited amount of air.

11. An apparatus for subjecting food substances of a normally viscous nature to a light treatment, comprising an enclosure, means for discharging the substance to be treated into the enclosure, a member onto which the substance is discharged for spreading the same into a thin layer and from which the substance drops in a falling curtain, means for maintaining the substance, while in the enclosure, in a fluid state, and means within the enclosure for producing desired light rays to which the substance is subjected as it falls from the spreading member.

12. An apparatus for subjecting food substances to a light treatment comprising an enclosure, means for discharging the substance to be treated into the enclosure, a spreading member having an inclined surface onto which the substance to be treated is discharged so that the substance flows down over the inclined surface and falls therefrom in a thin curtain, means for maintaining the substance, while in the enclosure, in a fluid state, means within the enclosure for producing the desired light rays to which the substance is subjected as it falls from the spreading member, and an outlet from the enclosure for conducting the treated material therefrom.

13. An apparatus for subjecting food substances of a normally viscous nature to a light treatment comprising an enclosure having means for admitting a limited amount of air, means for discharging the substance to be treated into the top of the enclosure, a member having an inclined surface onto which the substance to be treated is discharged whereby the substance flows down over the inclined surface and falls therefrom in a thin curtain, heating means within the enclosure for maintaining the substance in a fluid state, a source of highly actinic light within the enclosure beneath the inclined surface so that the substance is subjected to the rays of light emitted from said source as it falls in a curtain, said actinic rays of light combining with the limited air within the enclosure to produce ozone in the substance, and an outlet at the bottom of the enclosure into which the treated substance flows.

14. An apparatus for subjecting food substances of a normally viscous nature to a light treatment, comprising an upright enclosure of substantially conical shape at its ends with its lower conical end forming a funnel-like collector, means for discharging the substance to be treated into the upper end of the enclosure, a cone within the enclosure with its apex disposed beneath the means for discharging the material into the enclosure so that the material is discharged onto the apex of the cone and flows down over its sides to drop from its base in a cylindrical curtain, heating means for maintaining the substance in a fluid state while in the enclosure, a source of light rays with which the substance is to be treated positioned beneath the cone to be disposed within the cylindrical curtain of the falling substance so that the substance is subjected to the rays as it falls from the base of the cone, and an outlet communicated with the lower end of the collector to receive the treated substance.

15. An apparatus for subjecting food substances of a normally viscous nature to a light treatment comprising an upright enclosure of substantially conical shape at its ends with its lower conical end forming a funnel-like collector, means for discharging the substance to be treated into the upper end of the enclosure, a cone within the enclosure with its apex disposed beneath the means for discharging the material into the enclosure so that the material is discharged onto the apex of the cone and flows down over its sides to drop from the base in a cylindrical curtain, heating means for maintaining the substance in a fluid state while in the enclosure, a source of light rays with which the substance is to be treated inserted into the enclosure through an opening in its medial portion to be disposed beneath the cone and within the falling curtain of the substance to be treated, means external to the enclosure for supporting the source of light rays, and an outlet with which the bottom of the collector provided by the lower portion of the enclosure communicates to receive the treated material.

In testimony whereof I have hereunto affixed my signature.

HUGO W. ROHDE.